US005639433A

United States Patent [19]
Yuan et al.

[11] Patent Number: 5,639,433
[45] Date of Patent: Jun. 17, 1997

[54] EXTRACTION OF RARE EARTH ELEMENTS USING ALKYL PHOSPHINIC ACID OR SALT/ALKYL OR ARYL PHOSPHONIC ACID OR ESTER BLENDS AS EXTRACTANT

[75] Inventors: Chengye Yuan, Shanghai, China; Hengli Ma, Tucson, Ariz.

[73] Assignee: Cytec Technology Corp., Wilmington, Del.

[21] Appl. No.: 617,451

[22] Filed: Mar. 19, 1996

Related U.S. Application Data

[63] Continuation-in-part of Ser. No. 572,222, Dec. 13, 1995, abandoned.
[51] Int. Cl.$^6$ ................................................ C01F 17/00
[52] U.S. Cl. ............................................................ 423/21.5
[58] Field of Search .............................................. 423/21.5

[56] References Cited

U.S. PATENT DOCUMENTS

| 4,647,438 | 3/1987 | Sabot et al. | 423/21.5 |
|---|---|---|---|
| 4,927,609 | 5/1990 | Leveque et al. | 423/21.5 |
| 5,015,447 | 5/1991 | Fulford et al. | 423/21.5 |

FOREIGN PATENT DOCUMENTS

| 332512 | 9/1989 | European Pat. Off. | 423/21.5 |

*Primary Examiner*—Steven Bos
*Attorney, Agent, or Firm*—Frank M. Van Riet

[57] ABSTRACT

A method is disclosed whereby rare earth elements are extracted from acidic solutions thereof using, as an extractant, a mixture of an alkyl ($C_4$–$C_{12}$) phosphinic acid or salt and an alkyl ($C_4$–$C_{12}$) or aryl phosphonic acid or ester thereof.

12 Claims, No Drawings

EXTRACTION OF RARE EARTH ELEMENTS USING ALKYL PHOSPHINIC ACID OR SALT/ALKYL OR ARYL PHOSPHONIC ACID OR ESTER BLENDS AS EXTRACTANT

CROSS-REFERENCE TO RELATED APPLICATIONS

This application is a continuation-in-part of our application Ser. No. 08/572,222, filed Dec. 13, 1995, now abandoned, entitled EXTRACTION OF RARE EARTH ELEMENTS.

BACKGROUND OF THE INVENTION

The separation of rare earth elements from solutions thereof wherein the elements are recovered together or from one another has become of more importance in recent years. Procedures for such recoveries have been the subject of various patents e.g. U.S. Pat. Nos. 4,647,438 and 5,015,447, which patents are incorporated herein by reference.

The procedures set forth in these patents are directed to the use of phosphorus-containing extraction agents such as phosphoric acids, phosphonic acids, phosphinic acids, thiophosphinic acids and esters thereof. Additionally, phosphates such as tributyl phosphate and oxides such as trioctylphosphine oxide have been disclosed. These extractants are generally employed dissolved in a suitable organic diluent and have been shown to be especially effective when extracting rare earth elements from acidic solutions thereof. Rare earth elements are recognized as encompassing the lanthanide elements having an atomic number ranging from 57 to 71, inclusive, and yttrium whose atomic number is 39. Element 61, premethium, is, however, generally of less interest because of its radioactivity.

The general procedure employed for the separation of rare earth elements from solutions thereof, especially acidic solutions, is as follows, the feed solution generally resulting from treatment of a rare earth element containing ores such as monazite, bastnaesite, xenotime, bauxite and similar crude ores.

The feed stream of the rare earth in solution is treated in an extraction zone and may be contacted counter-currently or co-currently, with the diluent solution of the extractant to form a raffinate and an extract. Ofttimes a neutralizing agent such as ammonia is also introduced into the feed stream to control pH. The raffinate is removed and the extract containing the extracted rare earth elements(s) is usually sent to a scrubber wherein it is scrubbed with dilute acid and then sent to a stopper where it is stripped with more concentrated acid to separate the rare earth element(s). Hydrochloric acid is the preferred acid which the prior art procedures use to scrub and strip the extraction zone extract and mono-2-ethylhexyl phosphonic acid, mono-2-ethylhexyl ester is the most widely used acid extractant. Bis-(2,4,4-trimethylpentyl) phosphinic acid is also used.

Although this method has found significantly wide acceptance in the recovery of rare earth elements, the procedure suffers from various deficiencies which, if overcome, would make the process even more commercially attractive.

One problem associated with the above-known process is that because the selectivity of the extractant employed is not as definitive as one would like, many stages of mixer-settlers are needed to achieve the desired separation. For example, some rare earth plants require 300 stages. This is in contrast to the 4 to 8 stages required for copper recovery or the 10 to 20 stages for cobalt/nickel separation. Additionally, the phosphonic acid extractant referred to above requires the use of concentrated acid for striping, e.g. 6N HCl. This results in high costs for neutralization of the excess acid and contamination of the final product by chloride ions. The chloride contamination has been overcome by the use of some prior art procedures. However, recovery of the final rare earth element(s) with $HNO_3$ is less productive and less desirable because of the properties of nitric acid.

Therefore, a procedure whereby the above-described problems and deficiencies could be overcome or substantially reduced would solve a long-felt need.

SUMMARY OF THE INVENTION

A method has now been found whereby the above-enumerated problems have been mollified. This method enables the recovery of rare earth elements from acidic solutions thereof and is extremely efficient in the separation of rare earth elements from one another, especially in the separation of the "heavy" rare earth elements i.e. those of atomic numbers 65–71, inclusive, more especially in the separation of ytterbium (Yb) from lutetium (Lu).

The method achieves a better separation of the rare earth element(s) in the extraction zone and in the scrubbing zone, especially for separating Yb from Lu and enables a less concentrated hydrochloric acid solution to be used in the stripper to strip the Lu from the extractant and, as a result, there results less of a need to neutralize the HCl, i.e., the high selectivity of the extractant of the instant invention selectively removes the Yb from the Lu in the scrubber thereby enabling excellent acid stripping action in the stripper.

DESCRIPTION OF THE INVENTION INCLUDING PREFERRED EMBODIMENTS

The instant invention resides in a method of recovering rare earth elements from acidic solutions containing the same which comprises 1) contracting said solution with an extractant comprising a mixture of:

a) a phosphorus compound having the formula

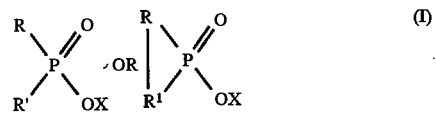

(I)

wherein R and $R^1$ are, individually, a substituted or unsubstituted, branched or straight chain alkyl group of 4 to 12 carbon atoms, inclusive, and X is hydrogen or a salt-forming radical, and b) a compound having the formula

(II)

where $R^2$ and $R^3$ are individually hydrogen, $C_4$–$C_{12}$ branched or straight chain alkyl or $C_6$–$C_{12}$ substituted or unsubstituted aryl groups, with the proviso that both $R^2$ and $R^3$ are not hydrogen, and 2) recovering the extracted rare earth elements.

The ratio of the phosphorous compound a) to the compound b) ranges from about 9:1 to about 3:7, respectively, preferably from about 3:2 to about 2:3, respectively, and most preferably from about 3:2 to about 1:1, respectively.

The extraction temperature ranges from about 10° C. to about 50° C., preferably, from about 15° C. to about 40° C., most preferably, from about 20° C. to about 30° C. and the pH in the extraction zone should be acidic i.e. under about 6.5, preferably from about 2 to 4.

The extractant mixture is optionally employed in conjunction with a diluent. Examples of useful diluents include the halogenated and non-halogenated aliphatic and/or aromatic hydrocarbons such as, for example, hexane, heptane, octane, dodecane, benzene, toluene, xylene, ethylbenzene, and petroleum cuts such as kerosene, fuel oil, JP-1 and the like.

The concentration of the extractant mixture in the diluent should range from about 1.0 to about 1.5 molar.

Suitable phosphorous compounds a) having the formulae (I) set forth above include the following:

Di-n-butylphosphinic acid;
Di-isobutylphosphinic acid;
Di-n-pentylphosphinic acid;
Di-n-hexylphosphinic acid;
Di-n-heptylphosphinic acid;
Di-n-octylphosphinic acid;
Bis(2-ethylhexyl)phosphinic acid;
Di-n-nonylphosphinic acid;
Di-n-decylphosphinic acid;
Di-n-dodecylphosphinic acid;
Bis(2,4,4-trimethylpentyl)phosphinic acid;
(2,4,4-Trimethylpentyl)cyclohexylphosphinic acid;
(2,4,4-Trimethylpentyl)octylphosphinic acid;
Dicylcopentylphosphinic acid;
Dicyclohexylphosphinic acid;
Dicyclooctylphosphinic acid;
Cyclohexyl-n-butylphosphinic acid;
Cyclopentyl-n-dodecylphosphinic acid;
Cyclooctylethylphosphinic acid;
2,4,6-Triisopropyl-1,3,5,-dioxaphosphodnane-5-hydroxy-5-oxide phosphinic acid;
Cyclohexyl-1-hydroxycyclohexylphosphinic acid;
Bis(2-methyl-1-hydroxypentyl)phosphinic acid;
Cyclopentyl-1-hydroxycyclopentylphosphinic acid;
1-Methylpentyl-1-hydroxy-1-methylpentylphosphinic acid;
(1-Hydroxy-1-methylethyl)isopropylphosphinic acid and the like.

The alkyl groups contain 4 to 12 carbon atoms, however, those of 6 to 10 carbon atoms are preferred. Preferably, X is hydrogen or an alkali metal or ammonium ion. U.S. Pat. Nos. 4,348,367; 4,353,883 teach such phosphonic acids and salts and are hereby incorporated herein by reference.

The phosphorus-based compounds of formula (II) corresponding to component b), above, include such compounds as mono-2-ethylhexyl phosphonic acid, mono-2-ethylhexyl ester; 2-ethylhexylphosphonic acid, mono-2-ethylhexyl ester; 3,3,5-trimethylhexylphosphonic acid, cyclohexyl ester; 2-ethylhexylphosphonic acid, cyclopentyl ester; phenylphosphonic acid, mono-2-ethylhexyl ester; n-amylphosphonic acid, mono-3-methyloctyl ester; 3,3,5-trimethylhexylphosphonic acid, 3,5,5-trimethylhexyl ester; 2-ethylhexylphosphonic acid, monoisodecyl ester; isodecylphosphonic acid, monoisodecyl ester and the like.

As mentioned above, the instant process is applicable to the separation of all rare earth elements from acidic solution, however those of atomic numbers 39 and 65 to 71, inclusive, are preferred and those of atomic numbers 39 and 69–71 are most preferred.

It has also been found, in accordance with the scope of the present invention, that up to about 20%, by volume, of the extractant mixture of components a) and b), above, can be replaced by a third component c) having the formula

wherein $R^2$ and $R^3$ are the same or different, and are $C_6$–$C_{10}$ aryl groups or $C_4$–$C_{12}$ alkyl groups, and Z is oxygen or sulfur.

Exemplary compounds falling within the scope of Formula III, above, include:

Di(2-ethylhexyl) phosphoric acid;
Di(2-ethylhexyl) thiophosphoric acid;
Di(dodecyl) phosphoric acid;
Di(dodecyl) thiophosphoric acid;
Di(cyclohexyl) thiophosphoric acid and the like.

The following examples are set forth for purposes of illustration only and are not to be construed as limitations on the present invention except as set forth in the appended claims. All parts and percentages are by weight unless otherwise specified.

Separation Factors

Batch shake-out tests are conducted by equilibrating equal volumes of the organic and aqueous phases (either 15 mL or 30 mL each) for 30 minutes at 25°±1° C. using a mechanical shaker. After phase separation, the rare earth concentration in the aqueous phase is determined by titration with EDTA. Equilibrium concentrations in the organic phases are calculated by mass balance and these results confirmed by stripping the loaded organics and analyzing the strip liquours; also by titration with EDTA.

The distribution coefficient (D) of a particular metal is defined as the ratio between its equilibrium concentrations in the organic and aqueous phases, i.e., D=Equilibrium Concentration in Organic/Equilibrium Concentration in Aqueous The extraction constant, Kex, is a function of D but is independent of pH and may be used to calculate more reliable separation factors.

$$Kex = D \frac{[H^+]^3}{[(HL)_2]}$$

where:

$H^+$—Equilibrium concentration of hydrogen ions in the aqueous phase;

HL=Concentration of free extractant in the organic phase at equilibrium;

The separation factor, β, is then defined as $$\beta_2^1 = \frac{K^1 ex}{K^2 ex}$$

EXAMPLE 1

The following results (Table 1) are obtained with aqueous solutions; initial pH=3, containing 0.1M each of $Lu^{(3+)}$, $Yb^{(3+)}$, $Tm^{(3+)}$ and $Er^{(3+)}$ as their chlorides and a solve containing mixtures of bis(2,4,4-trimethylpentyl) phosphinic acid (BTPP) and the synergic reagent, mono-2- ethylhexyl ester of 2-ethylhexyl phosphonic acid (MEPA), dissolved in dodecane.

TABLE 1

| Total Extractant Concentration (M) | Molar Ratio (in dodecane) BTPP | MEPA | β Lu/Yb | Yb/Tm | Tm/Er |
|---|---|---|---|---|---|
| 1.0 | 70 | 30 | — | 3.55 | 2.39 |
| 1.0 | 60 | 40 | — | 3.76 | 2.63 |
| 1.0 | 50 | 50 | 1.63 | 3.32 | 3.29 |
| 1.5 | 50 | 50 | 1.61 | 3.98 | 2.73 |
| 1.0(c) | 100 | 0 | 1.40 | 2.10 | 3.40 |
| 1.5(c) | 0 | 100 | 1.03 | 2.48 | 2.29 | c = comparative

The data in Table 1 shows the enhanced separation factors which are attributable to the use of the synergic combination of the instant invention.

EXAMPLE 2

Loading Capacity

The following data (Table 2) are obtained using an aqueous solution containing 0.071M or 0.1M Yb as $YbCl_3$, total ionic strength equivalent to 1M $Cl^-$ added as NaCl. Initial pH-3. The solvents are all made up in dodecane and each of the two extractants is present in a 50:50 molar ratio unless otherwise specified.

TABLE 2

| Total Extractant Concentration (M) BTPP | MEPA | Initial [Yb] aq (M) | O/A | Equilibrium [Yb] org (M) | Phase Separation |
|---|---|---|---|---|---|
| 1.0 | 0 (c) | 0.1 | 1.0:1.2 | 0.08 | Medium, Clear |
| 0.5 | 0.5 | 0.071 | 1.0:1.8 | 0.116 | Fast, Clear |
| 0.6 | 0.6 | 0.1 | 1.0:1.8 | 0.123 | Fast, Clear |
| 0.75 | 0.75 | 0.1 | 1.0:3.0 | 0.200 | Fast, Clear | c = comparative

The data show the effect of the synergism increasing loading capacity of the solvent; particularly where the total extractant concentration is 1.5M.

EXAMPLE 3

The following data illustrate the ease with which rare earths can be stripped from the loaded solvent with relatively dilute HCl (Table 3) and even with $HNO_3$ (Table 4).

TABLE 3

Solvent: 0.75M BTPP, 0.75M MEPA in dodecane.
The solvents are loaded to contain 0.1M Er, Tm or Yb
Strip Solutions: 0.3 to 6N HCl
Otherwise, the tests are carried out in accordance with the procedures of Example 1.

| HCl Normality | % Stripped Er | Tm | Yb |
|---|---|---|---|
| 0.3 | 6.25 | — | — |
| 0.5 | 21.5 | 11.4 | 4.62 |
| 0.7 | 36.5 | 22.6 | 10.5 |
| 1.0 | 56.7 | 34.3 | 21.6 |
| 1.5 | 75.6 | 50.1 | 37.6 |
| 2.0 | 89.3 | 67.7 | 52.6 |
| 2.5 | 95.8 | 84.4 | — |
| 3.0 | 96.5 | 95.1 | 84.7 |
| 4.0 | 99.8 | 101.1 | 95.4 |
| 5.0 | — | — | 97.3 |
| 6.0 | — | — | 97.9 |

TABLE 4

Stripping With Nitric Acid

| $HCO_3$ Normality | % Stripped Er | Tm | Yb |
|---|---|---|---|
| 0.5 | 17.5 | 9.5 | 3.69 |
| 0.7 | 31.5 | 18.9 | 9.36 |
| 1.0 | 50.8 | 32.0 | 20.7 |
| 1.5 | 72.3 | 48.5 | 36.4 |
| 2.0 | 79.1 | 66.5 | 51.3 |
| 2.5 | 86.4 | 77.0 | — |
| 3.0 | 85.8 | 80.3 | 69.0 |
| 4.0 | 86.5 | 84.1 | 74.9 |
| 5.0 | 87.8 | 85.3 | 75.7 |
| 6.0 | — | — | 74.3 |

EXAMPLE 4 (COMPARATIVE)

Chemically, the reagent of choice within the rare earth industry is mono-2-ethylhexyl phosphonic acid, mono-2-ethylhexyl ester (MEPA) alone. This is available commercially in China and also manufactured in Japan and in the U.S. The data shown in Table 5, below, illustrate the comparative difficulty with which ytterbium is stripped from MEPA with HCl and $HNO_3$. The experiments are carried out in accordance with the procedure of Example 3, except where indicated.

TABLE 5

Yb Stripping from MEPA with HCl and $HNO_3$

| Acid Normality | % Stripped HCl - 1.0M MEPA | HCl - 1.5M MEPA | $HNO_3$ - 1.5M MEPA |
|---|---|---|---|
| 0.5 | 1.77 | 0.50 | 0.24 |
| 1.0 | 11.6 | 2.79 | 2.45 |
| 1.5 | 25.6 | 10.3 | 8.24 |
| 2.0 | 35.1 | 20.7 | 17.4 |
| 3.0 | 55.1 | 43.5 | 31.1 |
| 4.0 | 79.2 | 67.2 | 45.1 |
| 5.0 | 88.7 | 79.2 | 49.3 |
| 6.0 | 89.9 | 82.7 | 49.3 |

EXAMPLES 5–8

Again, following the procedure of Example 1 except that BTPP is replaced by the phosphinic acid derivates set forth below, substantially equivalent results are achieved.

Example 5—Di-n-octylphosphinic acid.
Example 6—Dicyclohexylphosphinic acid.
Example 7—Bis(2-ethylhexyl)phosphinic acid.
Example 8—2,4,4-Trimethylpentylcyclohexyl phosphinic acid.
Stripping results are essentially as shown in Table 3.

EXAMPLES 9–11

The procedure of Example 1 is again followed except that the MEPA is replaced by the following phosphonic acids conforming to formula II, above.

Example 9—3,5,5-Tdmethylhexylphosphonic acid, mono-3,5,5-trimethylhexyl ester.

Example 10—2-Ethylhexylphosphonic acid, mono-isodecyl ester.

Example 11—Isodecylphosphonic acid, monoisodecyl ester.

Again, stripping is similar in its efficacy as shown in Tables 3 and 4.

We claim:

1. A method of recovering a rare earth element from acidic solution which consists essentially of 1) contacting said solution with an extractant comprising a mixture of:

a) a compound having the formula

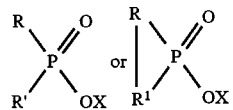

wherein R and $R^1$ are individually, a substituted or unsubstituted, branched or straight chain alkyl group of from 4 to 12 carbon atoms, inclusive, and X is hydrogen or a salt-forming radical and b) a compound having the formula

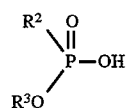

wherein $R^2$ and $R^3$ are, individually, hydrogen, $C_4$–$C_{12}$ branched or straight chain alkyl or $C_6$–$C_{12}$ substituted or unsubstituted aryl groups, with the proviso that both $R^2$ and $R^3$ are not hydrogen, and 2) recovering the extracted rare earth element.

2. A method according to claim 1 wherein the extractant is employed in conjunction with a diluent.

3. A method according to claim 1 wherein the rare earth element is recovered from the extractant by acid stripping.

4. A method according to claim 1 wherein both R and $R^1$ are the same.

5. A method according to claim 4 wherein both R and $R^1$ are 2-ethylhexyl.

6. A method according to claim 4 wherein both R and $R^1$ are 2,4,4-trimethyl-pentyl.

7. A method according to claim 1 wherein $R^3$ is alkyl.

8. A method according to claim 1 wherein $R^2$ is alkyl and $R^3$ is alkyl.

9. A method according to claim 1 wherein $R^2$ is 2-ethylhexyl.

10. A method according to claim 1 wherein $R^2$ and $R^3$ are 2-ethylhexyl.

11. A method according to claim 6 wherein $R^2$ and $R^3$ are 2-ethylhexyl.

12. A method according to claim 3 wherein the rare earth element phase is scrubbed with acid before stripping.

* * * * *